Dec. 22, 1936.    R. E. RISSER    2,064,988
AIR ELIMINATOR
Filed Nov. 15, 1934    2 Sheets-Sheet 1

Inventor
Ross Eugene Risser
By Jack Ashley
Attorney

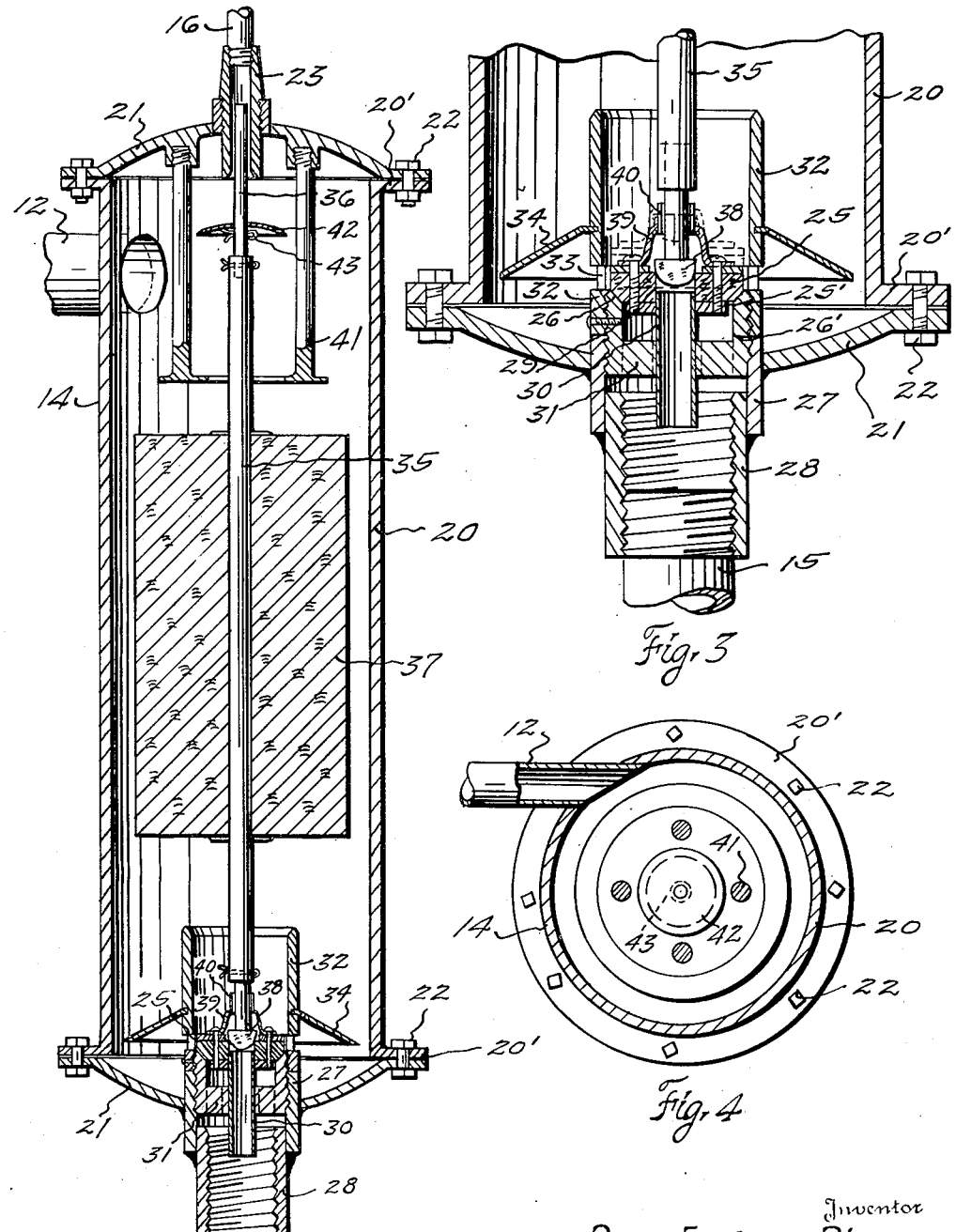

Patented Dec. 22, 1936

2,064,988

UNITED STATES PATENT OFFICE 2,064,988

AIR ELIMINATOR

Ross Eugene Risser, Bonham, Tex.

Application November 15, 1934, Serial No. 753,127

3 Claims. (Cl. 183—2.5)

This invention relates to new and useful improvements in air eliminators.

One object of the invention is to provide an improved air eliminator for separating air and liquid, particularly adapted for use with the ordinary gasoline dispensing pump, and arranged to effectively separate the liquid from the air prior to the passage of the liquid to the flow meter, whereby only liquid is conducted to said meter and the actual quantity of liquid dispensed is recorded.

An important object of the invention is to provide an improved separator connected in a liquid discharge line, wherein influent is introduced into the upper end of the separator and given a whirling motion to bring about separation of the liquid from the air and gaseous vapors, whereby the liquid, being heavier is thrown to the outer edge of the whirl and will take a downward helical path, while the air and vapors, being lighter will accumulate in the center or vortex of the whirl and will ascend within the separator; thereby effectively separating the liquid from the air and vapors.

Another object of the invention is to provide an improved valve for closing the liquid discharge of an air eliminator, said valve including means for equalizing the pressure on each side of the valve prior to the opening of the valve, whereby resistance to the opening of the valve is greatly reduced; said valve and said means being controlled by a single operating means which is actuated by the rise and fall of the liquid within the eliminator.

Still another object of the invention is to provide an improved air eliminator wherein liquid and air are separated, said separation being brought about by subjecting the influent in the eliminator to a whirling motion, said eliminator including means for conducting the air and vapors which have been separated to a trap wherein the liquid is trapped and the air is permitted to escape to the atmosphere.

A further object of the invention is to provide an improved baffle or apron which surrounds the liquid discharge opening of an air eliminator, whereby the liquid adjacent the walls of the eliminator is discharged first.

Figure 2 is a transverse, vertical, sectional view of the eliminator,

Figure 1:
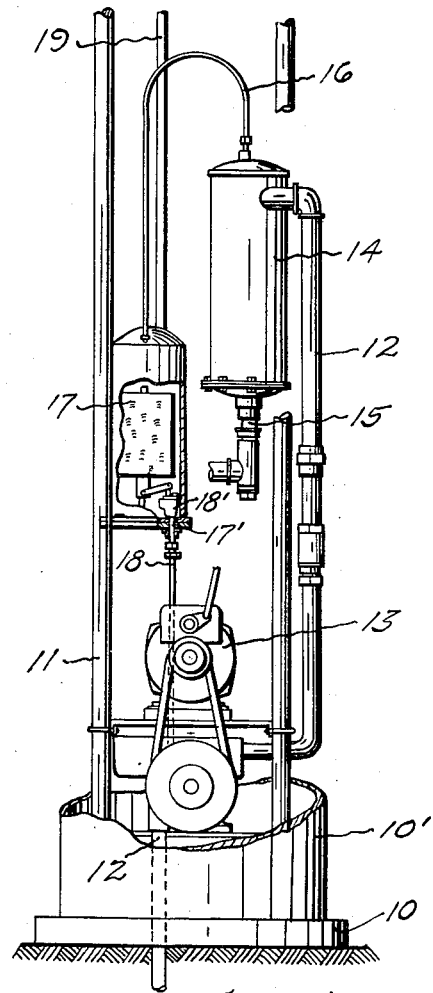
Figure 1 is a partial elevation of a gasoline pump, having an air eliminator constructed in accordance with the invention attached thereto.
Figure 5:
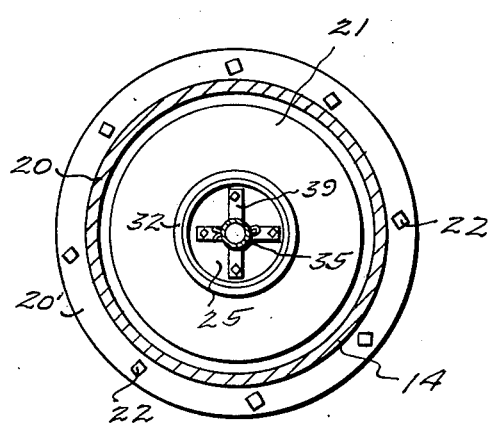
Figure 6:
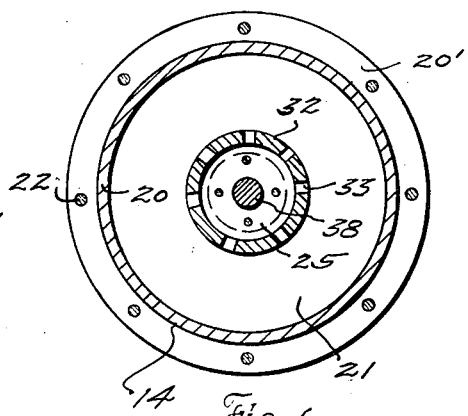
Figure 7:
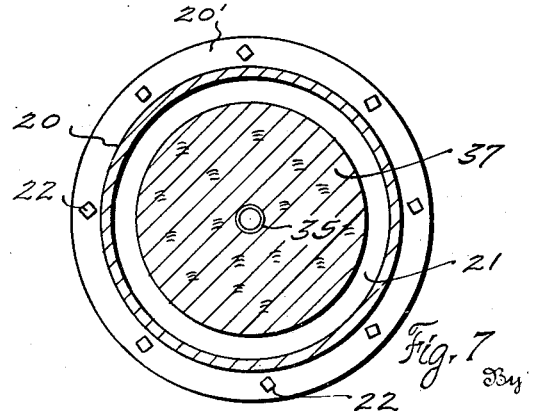

Figure 3 is an enlarged, sectional detail of the valve controlling the liquid discharge, Figure 4 is a horizontal, cross-sectional view, taken on a line through the liquid inlet, Figure 5 is a horizontal, cross-sectional view, taken on a line above the liquid discharge valve, Figure 6 is a horizontal, cross-sectional view taken through the liquid discharge valve, and Figure 7 is a horizontal, cross-sectional view taken through the float.

In the drawings, the numeral 10 designates the base of an ordinary gasoline dispenser. The usual standards, or supports, 11 extend vertically from the base and are surrounded by a cylindrical casing or housing 10'. A supply line 12 extends upwardly within the casing from the usual underground tank (not shown) and a suction pump unit 13, which is carried by the standards 11 nearer the lower end of the same, is connected in the line 12. It is obvious that when the pump unit is operated, liquid is elevated and caused to flow through the supply line 12.

The upper end of the line 12 is connected to the upper end of a separating tank 14 which is mounted on one of the standards. Within this tank, the liquid is separated from the air which may have accumulated in the storage tank and supply line, and also from the gaseous vapors. The liquid is discharged from the tank 14 through a liquid discharge pipe 15 which conducts the liquid to the usual flow meter (not shown). The air and gaseous vapors escape from the tank 14 through a small pipe 16 leading from the top of said tank to the upper end of a trap 17.

The trap which is preferably cylindrical, is fastened on one of the standards and is provided with an outlet opening 17' in its bottom. This opening is normally closed by a float valve 18' which is operated by the liquid level within the trap. A pipe 19 leads from the upper end of the trap and has its upper end open to the atmosphere. The gaseous vapors are conducted to the trap through the small pipe 16 and when said vapors enter the enlarged area within the tank, the sudden expansion and subsequent separation releases the air from the vapors, and also causes the vapors to liquify. The air rises within the trap and escapes through pipe 19 to the atmosphere, while the liquid is trapped in the bottom of said trap. When the liquid within said trap reaches a predetermined level, the float valve 18' is operated and the liquid flows from the trap through the outlet 17', and through a pipe 18 which is connected to the pump unit 13, whereby said liquid is conducted back to the supply line 12. If desired, the liquid from the trap could be conducted back to the underground storage tank (not shown) instead of to the pump unit 13.

It is essential that the liquid be separated from the air which is admixed therewith prior to the passage of the liquid to the flow meter. Otherwise the passage of such air would be registered as liquid and an inaccurate recording as to the quantity of liquid would be had. It will be noted that the separating tank 14 is connected in the supply line 12 between the suction pump unit 13 and the discharge pipe 15 to the meter.

As clearly shown in Figure 2, the separating tank 14 comprises an elongated, cylindrical body 20, which has its upper and lower ends closed by flanged covers 21 which are secured to annular flanges 20', at the upper and lower ends of said body, by bolts 22. The supply line 12 is tangentially connected to the tank near the upper end thereof (Figure 4), whereby the influent is directed circumferentially around the inner wall of the tank. Thus, a whirling motion is imparted to the liquid and this action throws the heavier particles of liquid against the wall of the tank, while the air and vapor, being lighter, accumulate in the center or vortex of the whirl. The liquid flows in a downward, helical path to the bottom of the tank, and the air and vapor rise therein and escape from the tank through an elongated sleeve 23 which is mounted axially in the top 21. The upper end of the sleeve has the small pipe 16, which leads to the trap 17 connected thereto.

For controlling the discharge of liquid from the tank a valve 25 is mounted axially within the tank at the bottom thereof. The valve is preferably constructed of cork, although this is not essential, and has a reinforcing plate 25' secured to its underside. The valve is arranged to engage an annular valve seat 26 which is formed at the upper end of a collar 26'. The collar is externally threaded and has its lower half screwed into the upper end of a coupling 27 which is fastened in the bottom of the tank and extends therethrough. An internally screw-threaded nipple 28 is welded or otherwise secured in the lower end of the coupling and receives the discharge pipe 15 which leads to the flow meter (not shown).

The valve 25 and plate 25' are provided with an axial bore 29 and a tubular stem 30 depends therefrom. The stem is slidable through a spider 31 at the lower end of the collar 26', whereby the valve is guided during its vertical movement. The upper screw-threaded end of the collar receives the lower end of a sleeve 32 which extends upwardly above the valve 25. It is pointed out that the sleeve is of a slightly larger diameter than the valve and said valve moves vertically therein when operated. The sleeve is provided with a plurality of openings 33 near its lower end just above the top of the valve seat, whereby liquid in the bottom of the tank may pass out through these openings when the valve is open.

A frustro-conical baffle, or apron 34 surrounds and is carried by the sleeve and has its outer edge adjacent the walls of the tank. Thus, when the valve 25 is open the tendency will be for the liquid to be drawn from the wall of the tank where the heavier particles of liquid are located, rather than from the center of the tank at which point the air and vapor accumulate. Of course, the air and vapor rise rapidly and the liquid may be released through the openings 33 without the use of the baffle, although the latter increases efficiency.

For opening and closing the valve 25, an axial plunger, or rod 35 extends vertically within the tank. The upper end of the rod is provided with a guide stem 36, the upper end of which is loosely slidable in the elongated sleeve 23 in the top of the tank. A cylindrical float 37 is fastened on the plunger, and it is obvious that as the liquid level within the tank varies, said plunger will be moved vertically within the tank.

The lower end of the plunger extends downwardly within the sleeve 32 surrounding the valve 25, and has an equalizing valve 38 secured thereto. The valve 38 is arranged to seat on the upper end of the bore 29 of the valve 25, whereby said bore is closed. An upwardly extending spider 39 is fastened to the top of the valve 25 and carries a small collar 40 at its upper end. This collar surrounds the stem of the valve 38 and is of such diameter that the stem is slidable therethrough but the valve proper having a larger diameter cannot pass therethrough. Thus, when the float 37 lifts the plunger and valve 38, the valve is lifted from its seat to permit liquid to flow around said valve and downwardly through the bore 29 and hollow stem 30 of the valve 25. This equalizes the pressure on each side of the valve 25 which is seated at this time. Further upward movement of the plunger will cause the valve 38 to engage the underside of the collar 40 carried by the spider 39, thereby raising the valve 25 from its seat 26 and permitting liquid in the bottom of the tank to escape to the discharge 15. Upward travel of the float 37 is limited by a suitable stop 41 which depends from the top of the tank within the same. It is pointed out that by providing the equalizing valve 38 which opens first, the pressure on each side of the valve is equalized and less resistance to the opening of the valve 25 is had. If the valve 38 were not provided, the resistance to the opening of the valve 25 would be such that an enormous float would be necessary to lift the plunger 35 which operates the valve.

In operation, the influent is conducted into the tank 14 from the supply line 12. Since this line is mounted in the tank wall at a tangent, the liquid is directed around the wall of said tank, thereby imparting to it, a whirling motion. The heavier particles of liquid are thrown outwardly and whirl along the cylindrical inner wall face, while the air, vapor, and lighter particles of liquid, in a fine mist, accumulate in the center or vortex of said whirl. The air and gaseous vapors rise in the tank and escape therefrom through the pipe 16 to the trap 17. The heavier particles of liquid flow downwardly in a helical path to the bottom of the tank and when the level of this liquid rises sufficiently to raise the float 37, the equalizer valve 38 is raised to open the bore 29 of the valve 25.

This provides for an equalization of the pressure above and below the valve 25 and a continued rise in the level of the liquid lifts the valve 25 from its seat 26. Most of the liquid escaping to the discharge line 15 will be from beneath the annular frustro-conical baffle, or apron 34, although some liquid will escape through the bore 29 of the valve. When the valve 25 is wide open, the upper end of the float 37 strikes the stop 41 to limit the upward movement of the float.

The stem 36 of the plunger 35 has a poppet valve 42 slidably mounted thereon, the poppet being supported on the stem by a cotter pin 43. When the float reaches its limit of upward movement, the poppet is approximately ⅛" from the lower end of the elongated sleeve 23. If the liquid level continues to rise to the top of the tank, the poppet 42 will float upwardly on the liquid to close the lower end of the sleeve to prevent an undue amount of liquid from escaping through the outlet 16 to the trap. As the liquid level recedes, the poppet will drop down onto the pin 43 and reopen the sleeve 23 to permit air and gaseous vapors to escape.

From the foregoing, it is obvious that the liquid is separated from the air and gaseous vapors, and a positive control of the discharge of the liquid is had.

The level of the liquid at all times controls the discharge and there are few wearing parts and no adjustments to be made. Although, the poppet 42 is shown and described, it is merely a safety feature and efficient operation could be had without it. The float 37 is preferably constructed of cork, as are the valves 25 and 38, but it is to be clearly understood that they may be of any suitable material. The poppet 42 is preferably formed in inverted shape, as shown. It is pointed out that the influent is introduced at the upper end of the tank and the liquid, being discharged from the bottom thereof, must travel downwardly the entire height of the tank, thereby providing ample time for complete separation of the liquid from the air and gaseous vapors.

Although I have shown and described the invention as used in combination with the ordinary gasoline dispensing pump, it is pointed out that it is adaptable to any use wherein it is desirable to separate liquid from air and vapors, prior to conducting the liquid to a flow meter, whereby a positive ascertainment of the liquid passing through such meter may be had.

What I claim and desire to secure by Letters Patent, is:

1. An air eliminator comprising, a tank, means for admitting and directing an air and liquid influent tangentially circumferentially within the upper end of the tank, whereby the heavier liquids are separated from the lighter air and gaseous fluids, a trap for receiving the air and gaseous fluids, a conductor for carrying the air and gaseous fluids from the top of the tank to the trap, a liquid discharge line extending downwardly from the bottom of the tank, a valve seat at the upper end of said line, a liquid outlet valve arranged to engage the seat and having an axial bore therethrough, a spider extending upwardly from the valve, a vertical plunger extending through said spider, an equalizing valve on the lower end of the plunger and arranged to engage the upper end of the bore of said liquid outlet valve to close the same, float means actuated by the rise and fall of the liquid within the tank for raising and lowering the plunger to raise and lower the equalizing valve and outlet valve, a hoodlike frustro-conical annular baffle surrounding the outlet valve thereabove and having its circumferential edge adjacent to the inner wall of the tank, whereby the liquid at this edge is directed from the tank when the outlet valve is open, and means slidable endwise on said plunger operated by the liquid level to close communication between said tank and conductor for preventing escape of the air and gaseous fluids from the top of the tank.

2. An air eliminator including, a receiving and separating tank having means for admitting and directing an air and liquid influent tangentially circumferentially within the upper end of said tank, a vent pipe extending from the top of said tank, a trap separated from the tank and connected with said vent pipe for receiving air and gaseous fluids from the tank, a drain pipe extending from the bottom of said trap, a central discharge pipe leading from the bottom of the tank, a tubular open-ended upward extension of said pipe within the tank, having lateral openings, an external hooded annular baffle on said tubular extension above said lateral openings, an internal annular seat in said tubular extension below said lateral openings, and a float actuated valve on said internal annular seat controlling the discharge of liquid into said discharge pipe.

3. An air eliminator including, a receiving and separating tank having means for admitting and directing an air and liquid influent tangentially circumferentially within the upper end of said tank, a vent pipe extending from the top of said tank, a trap separated from the tank and connected with said vent pipe for receiving air and gaseous fluids from the tank, a drain pipe extending from the bottom of said trap, a central discharge pipe leading from the bottom of the tank, a float actuated valve in said tank controlling the discharge of liquid into said discharge pipe, an open-ended hollow cylinder surrounding said float actuated valve and having lateral openings above the valve, an external hoodlike frustro-conical annular baffle on said hollow cylinder above said lateral openings, a stop in the tank limiting the upward movement of the float of said valve, and an additional float valve in said tank adapted to close the vent pipe upon an abnormal rise of liquid in the tank.

ROSS EUGENE RISSER.